(12) United States Patent
Penz et al.

(10) Patent No.: US 10,967,904 B2
(45) Date of Patent: Apr. 6, 2021

(54) EMERGENCY VEHICLE DESIGNED AS A TRUCK

(71) Applicant: Rosenbauer International AG, Leonding (AT)

(72) Inventors: Edmund Penz, Linz (AT); Alexander Ronacher, Hoersching (AT); Stefan Zauner, St. Martin i.M. (AT)

(73) Assignee: Rosenbauer International AG, Leonding (AT)

( * ) Notice: Subject to any disclaimer, the term of this patent is extended or adjusted under 35 U.S.C. 154(b) by 125 days.

(21) Appl. No.: 16/332,489

(22) PCT Filed: Sep. 8, 2017

(86) PCT No.: PCT/AT2017/060217
§ 371 (c)(1),
(2) Date: Mar. 12, 2019

(87) PCT Pub. No.: WO2018/049442
PCT Pub. Date: Mar. 22, 2018

(65) Prior Publication Data
US 2019/0217897 A1    Jul. 18, 2019

(30) Foreign Application Priority Data
Sep. 13, 2016 (AT) .............. A 50811/2016

(51) Int. Cl.
*B62D 21/04* (2006.01)
*B62D 23/00* (2006.01)
(Continued)

(52) U.S. Cl.
CPC ............. *B62D 21/04* (2013.01); *B62D 21/02* (2013.01); *B62D 21/18* (2013.01); *B62D 23/00* (2013.01); *B62D 25/20* (2013.01); *B62D 33/00* (2013.01)

(58) Field of Classification Search
CPC ........ A62C 27/00; B62D 21/02; B62D 21/04; B62D 21/09; B62D 21/18; B62D 23/00;
(Continued)

(56) References Cited

U.S. PATENT DOCUMENTS 1,872,442 A * 8/1932 Goode .................... B60L 50/16
                                                              180/69.6
2,488,978 A    11/1949 Julien et al.
(Continued)

FOREIGN PATENT DOCUMENTS

CN        85104630 A      6/1986
CN       101565057 A     10/2009
(Continued)

OTHER PUBLICATIONS

International Search Report in PCT/AT2017/060217, dated Dec. 12, 2017.

*Primary Examiner* — Jason S Daniels
(74) *Attorney, Agent, or Firm* — Collard & Roe, P.C.

(57) ABSTRACT

The invention relates to an emergency vehicle (1) designed as a heavy truck, comprising a vehicle body (2) having an underbody assembly (9), a roof assembly (10) and at least one longitudinal wall (11, 12). Furthermore, a central longitudinal beam (8) is provided that is disposed in a manner extending in vehicle longitudinal direction. The central longitudinal beam (8) is joined directly and securely to the vehicle body (2), wherein it forms an integral constituent of the underbody assembly (9) of the vehicle body (2).

14 Claims, 4 Drawing Sheets

(51) Int. Cl.
  *B62D 33/00*  (2006.01)
  *B62D 25/20*  (2006.01)
  *B62D 21/02*  (2006.01)
  *B62D 21/18*  (2006.01)

(58) Field of Classification Search
  CPC .......................... B62D 25/20; B62D 25/2009;
          B62D 25/2036; B62D 33/00; B62D 63/02
  USPC ........................................ 296/181.1, 193.07
  See application file for complete search history.

(56) References Cited

U.S. PATENT DOCUMENTS

| | | | |
|---|---|---|---|
| 3,279,816 A | 10/1966 | Issigonis | |
| 4,683,976 A * | 8/1987 | Hawelka | B60K 25/06 |
| | | | 180/311 |
| 5,785,372 A * | 7/1998 | Glatzmeier | B62D 33/042 |
| | | | 296/24.45 |
| 7,077,462 B1 | 7/2006 | De Gaillard | |
| 7,270,346 B2 * | 9/2007 | Rowe | B60G 11/30 |
| | | | 280/781 |
| 7,712,823 B2 * | 5/2010 | Greater | F41H 7/042 |
| | | | 296/187.07 |
| 9,802,650 B2 | 10/2017 | Nishida et al. | |
| 9,988,113 B2 | 6/2018 | Habernegg | |
| 2009/0267337 A1 | 10/2009 | Siekaup et al. | |

FOREIGN PATENT DOCUMENTS

| | | |
|---|---|---|
| CN | 203158082 U | 8/2013 |
| DE | 23 22 935 A1 | 11/1974 |
| DE | 10 2009 017 194 A1 | 10/2010 |
| DE | 10 2010 020 313 A1 | 11/2011 |
| DE | 10 2010 032 072 A1 | 1/2012 |
| DE | 10 2012 106 451 A1 | 5/2014 |
| EP | 1 488 986 A1 | 12/2004 |
| EP | 3 012 175 A1 | 4/2016 |
| FR | 2 960 506 A1 | 12/2011 |
| GB | 1 601 320 A | 10/1981 |
| GB | 2168015 A | 6/1986 |
| WO | 01/94141 A1 | 12/2001 |
| WO | 2015/055323 A1 | 4/2015 |

\* cited by examiner

Fig.1

EMERGENCY VEHICLE DESIGNED AS A TRUCK

CROSS REFERENCE TO RELATED APPLICATIONS

This application is the National Stage of PCT/AT2017/060217 filed on Sep. 8, 2017, which claims priority under 35 U.S.C. § 119 of Austrian Application No. A 50811/2016 filed on Sep. 13, 2016, the disclosure of which is incorporated by reference. The international application under PCT article 21(2) was not published in English.

The invention relates to an emergency vehicle, especially a fire truck, designed as a heavy truck.

DE 10 2010 032 072 A1 describes a bottom load-bearing structure of a motor vehicle designed as a passenger car. The bottom load-bearing structure comprises a middle tunnel, which is situated in the vehicle middle, extends in vehicle longitudinal direction, consists of a closed hollow profile and is used as a container for the protected receiving of traction batteries. A tunnel longitudinal beam, a bottom metal plate and on the outer sides a sill are respectively disposed on both sides of the middle tunnel. In the plane of the bottom load-bearing structure and in longitudinal direction of the middle tunnel, flanges are respectively molded onto the hollow profile on the longitudinal-beam side of the tunnel. By introduction from the motor-vehicle underside into the region between the tunnel longitudinal beams, the middle tunnel can be joined to the tunnel longitudinal beams by means of the flanges. The said load-bearing bottom structure is formed respectively by the tunnel longitudinal beams, the bottom metals plates and the sills on the outer sides. The middle tunnel designed as a hollow profile serves only for protected receiving of traction batteries and in the direction of its longitudinal extent can be joined on both sides with the load-bearing longitudinal beams and thus held on them. For replacement of the traction batteries, the middle tunnel together with the traction batteries received therein may be picked up and removed.

FR 2 960 506 A1 also describes a vehicle designed as a passenger car. The vehicle comprises a load-bearing frame of a beam, which is disposed in the middle between the wheel pairs and to which a front module, a bottom module and a tail module are attached. The roof structure together with the windows situated all around is placed on this load-bearing frame situated at the bottom side.

DE 10 2010 020 313 A1 has disclosed a load-bearing structure of a vehicle body for a passenger car. The load-bearing structure comprises at least one middle tunnel and a back-wall unit, which is joined to the middle tunnel with formation of at least one load path. The back-wall unit is provided with a bracing unit, which is joined to the middle tunnel of the load-bearing structure for formation of a second load path. The back-wall unit is additionally joined to at least one seat transverse beam and/or a B-post and/or a roof-structure unit of the load-bearing structure. Due to the additional bracing unit between the back-wall unit and the middle tunnel, the second load path is created for the increase of the stiffness of the load-bearing structure, via which an improved transmission of loads occurring in the load-bearing structure and a more uniform distribution of these loads in the load-bearing structure can take place. Occurring loads can therefore be transmitted into both load paths of the load-bearing structure. Especially in the case of a loading of the middle tunnel in torsion, a further transmission of the occurring stresses takes place from the middle tunnel via the bracing unit into the back-wall unit. From this, a reduction of the torsional loads in the middle tunnel results. Via the bracing unit, occurring loads can be definitely dissipated in structurally simple and inexpensive manner and/or be further transmitted to the back-wall unit, in order in this way to improve the stiffness of the vehicle body. The additional bracing unit increases the stiffness of the body structure between the passenger compartment and the rear end, so that the vehicle occupants are better protected in the case of a rear-end collision.

EP 3 012 175 A1 also describes merely the formation of a vehicle as a passenger car in a monocoque construction. An upper member is fastened on a lower member molded from a thermoplastic material. The upper member is formed from a transparent thermoplastic plastic. The lower member is constructed in the form of a plate and comprises a flange portion that laterally surrounds and projects from the plate as well as a stiffening rib disposed in a manner running in middle position. The lower plate-like member carries the upper member, which is disposed thereon and fastened thereto, and which may be formed from several upper member parts.

U.S. Pat. No. 3,279,816 A has disclosed a bottom chassis, formed in load-bearing manner, of a motor vehicle. The bottom chassis comprises a structure formed in the manner of a plate with booms disposed at the front end as well as flange plates disposed at the tail end. In the direction of the longitudinal extent of the structure formed in plate-like manner, a central stress-bearing element is disposed in the form of a tunnel in the vehicle middle. The tunnel-like element is securely joined to the booms disposed at the front end as well as the flange plates disposed at the tail end.

U.S. Pat. No. 2,488,978 A describes a frame for a passenger car designed as a convertible. A centrally disposed beam having a U-shaped cross section is fastened on a bottom plate. Around the periphery of the base plate, side walls, a back-wall unit and a front unit are fastened thereon.

EP 1 488 986 A1 describes a motor vehicle, designed as a passenger car, having a joint arrangement in the roof region. The said joint arrangement is provided between a reinforcing frame for a special roof and the vehicle body, which may be used both for 2-door and for 4-door passenger cars.

DE 10 2012 106 451 A1 has disclosed a roof structure for a driver's cab of a utility vehicle. In this case, like parts are used for different roof modules, in that rolled profiles are formed for roof longitudinal beams and roof transverse beams having different length and if necessary having different flanges. Thus the roof structure may be reduced essentially to three different profile types, namely to a longitudinal-beam profile, a transverse-beam profile and a post profile.

WO 01/94141 A1 describes a modular roof of a motor vehicle designed as a passenger car. The roof construction of the body shell comprises a front and a rear transverse spar as well as a right and a left side spar, wherein the modular roof is provided with at least two roof-module elements, which are fastened directly on the roof construction. The roof-module elements extend preferably over the entire width of the roof construction and are fastened, in particular detachably, on the oppositely situated side spars.

In vehicle construction, the term box truck refers to any structure of heavy trucks in which the body of the box-like structure forms a structural unit together with the driver's compartment or the driver's cab. The entire box-like structure was built on an intermediate frame, wherein the intermediate frame of the box-like structure was mounted on a vehicle chassis and carried by it. In recent times, the box-like structural form of heavy trucks has been superseded by a so-called coffer structure. The driver's compartment or the driver's cab was then mounted in tiltable manner on the vehicle chassis. Thereby a continuous secure connection with the box could not be formed, since a tilting of the driver's compartment together with the securely connected box would not be possible. The vehicle frame comprises a central middle frame or longitudinal frame, on which the respective wheel pairs, the drive components, the fuel tank and other components are held. On the middle frame or longitudinal frame of the vehicle frame, either the entire box-like structure or the driver's compartment or the driver's cab and the built-in coffer structure was braced respectively as a self-supporting structure with interposition of an additional load-bearing frame. For these vehicle superstructures, it is disadvantageous that a built-in load-bearing box-like structure or the driver's compartment and the self-supporting coffer structure were provided on the vehicle frame.

Furthermore, a frame structure type is also known for vehicles in which the vehicle frame was formed by a so-called backbone tube chassis. The backbone tube chassis is formed as a load-bearing, middle construction element, which receives the further vehicle elements, which usually are not constructively loaded. Thus the backbone tube chassis forms the load-bearing structure underneath a body that is not load-bearing.

The task of the present invention was to overcome the disadvantages of the prior art and to provide an emergency vehicle in which the vehicle body forms a cohesive structural unit and this has a compact overall structure. Furthermore, it is even intended that a weight-saving structural unit will also be formed.

This task is accomplished by an emergency vehicle according to the claims.

The emergency vehicle according to the invention is designed as a heavy truck and is used in particular as a fire truck for firefighting operations or for saving and/or rescuing of persons as well as items. The emergency vehicle has a front end and a tail end spaced apart therefrom in vehicle longitudinal direction, and it comprises:
- a vehicle body having an underbody assembly, a roof assembly and a left longitudinal wall and a right longitudinal wall, wherein the longitudinal walls are disposed between the underbody assembly and the roof assembly,
- a central longitudinal beam, which longitudinal beam is disposed in a manner extending in vehicle longitudinal direction, wherein
- the underbody assembly comprises a bottom structure and the bottom structure is securely joined directly to the central longitudinal beam, and wherein
- the central longitudinal beam forms an integral constituent of the underbody assembly of the vehicle body,
- at least one front-wheel pair and at least one rear-wheel pair, wherein the at least two wheel pairs are held on the central longitudinal beam;
- a drive unit, which drive unit is in driving communication with at least one of the wheel pairs, and that
- the underbody assembly forms a bottom chord, especially a tension chord, of the vehicle body,
- the roof assembly forms an upper chord, especially a compression chord, of the vehicle body,
- the vehicle body comprises several transverse walls,
- at least individuals of the transverse walls are securely joined directly to the central longitudinal beam of the underbody assembly,
- at least individuals of the transverse walls are securely joined to at least one of the longitudinal walls of the vehicle body,
- the vehicle body comprises a driver's cab, which driver's cab forms an integral structural unit of the vehicle body,
- the central longitudinal beam is securely joined directly to the vehicle body, and that
- the vehicle body together with the longitudinal beam integrated therein forms a structural, continuously cohesive unit from the front end to the tail end.

The advantage achieved thereby is that, due to the integration of the central longitudinal beam with the vehicle structure, namely the vehicle body, a compact self-supporting overall structure can be created and so additional intermediate frames can be dispensed with for the formation of the vehicle structure. Since the central longitudinal beam is disposed on the ground side, it represents the self-supporting overall structure, due to its integration in the underbody assembly together therewith, in interaction with the further body parts. Furthermore, due to the integration of the central longitudinal beam and the omission of intermediate frames that otherwise would be needed, on the one hand weight can be saved and on the other hand an additional receiving space within the vehicle structure is created. Thus, despite the intermediate frame that is no longer needed, a stable overall load-bearing structure can nevertheless be formed.

The underbody assembly forms a bottom chord, especially a tension chord, of the vehicle body. Due to the integration of the central longitudinal beam in the underbody assembly, an adequately massive base capable of bearing load can be created in this way for the vehicle designed as a heavy truck.

Furthermore, the underbody assembly comprises a bottom structure, wherein the bottom structure is securely joined directly to the central longitudinal beam. Due to the provision of the bottom structure, a closed structural unit, which additionally even develops an adequate stiffness and strength up to the longitudinal and side walls, can be created in this way in the bottom region of the vehicle body.

The vehicle body further comprises several transverse walls. Due to the provision of several transverse walls within the vehicle body, an additional stiffening of the entire vehicle body can be achieved. Furthermore, however, an adequate spacing-apart of the roof assembly from the underbody assembly can be achieved therewith depending on selected overall height of the transverse walls. Furthermore, the transverse walls may also be used even to subdivide the receiving space situated within the vehicle body into individual compartments.

Furthermore, at least individuals of the transverse walls are securely joined directly to the central longitudinal beam of the underbody assembly. Thus an adequately stable and sturdy vehicle body can be created.

Furthermore, individuals of the transverse walls are securely joined to at least one of the longitudinal walls of the vehicle body. Due to the provision of at least one of the longitudinal walls and their connection to the transverse wall or walls, an even more stable overall structure of the vehicle body may therefore be achieved.

The roof assembly forms an upper chord, especially a compression chord, of the vehicle body. Due to the incorporation of the entire roof assembly into the formation or the structure of the vehicle body, this may likewise serve as a load-bearing structural unit. Thus, together with the underbody assembly and the spacing-apart of the two assemblies from one another by the transverse walls as well as longitudinal walls, an inherently self-supporting overall structure can be created depending on requirement.

Furthermore, the vehicle body comprises a driver's cab, wherein the driver's cab forms an integral structural unit of the vehicle body. In this case the driver's cab is enclosed by a partial portion of the underbody assembly, by a partial portion of the roof assembly, by partial portions of the longitudinal walls as well as by, depending on size and receiving capacity, at least two transverse walls. Thus a continuous, cohesive structural unit of the emergency vehicle can be created. By virtue of the integration of the entire driver's cab in the vehicle structure of the vehicle body, an even better cohesive self-supporting structure can be created therewith.

Furthermore, it may be advantageous when the longitudinal beam is designed as a hollow-profile member having a polygonal cross section. Due to the formation of the longitudinal beam as a hollow-profile member, a high natural stiffness of the same can therefore be achieved. Beyond this, however, a receiving space within the longitudinal beam can also be created in this way, for example for drive components, fuel, extinguishing materials, extinguishing water or the like. Preferably, a rectangular cross section is chosen that is integrated in constructive manner into the underbody assembly and that may also be provided with the most diverse fastening capabilities.

Another embodiment is characterized in that the underbody assembly forms a bottom chord, especially a tension chord, of the vehicle body. Due to the integration of the central longitudinal beam in the underbody assembly, an adequately massive base capable of bearing load can be created in this way for the vehicle designed as a heavy truck.

A further possible embodiment has the features that the underbody assembly comprises a bottom structure and that the bottom structure is securely joined directly to the central longitudinal beam. Due to the provision of the bottom structure, a closed structural unit, which additionally even develops an adequate stiffness and strength up to the longitudinal and side walls, can be created in this way in the bottom region of the vehicle body.

A further design provides that a receiving channel is disposed or formed in the bottom structure, which receiving channel extends in vehicle longitudinal direction, and that the central longitudinal beam is received at least in some regions in the receiving channel. Due to the provision or formation of a receiving channel in the bottom structure, an even better space-saving receiving of the central longitudinal beam within the underbody assembly can be achieved.

Another embodiment is characterized in that the receiving channel, starting from a bottom underside of the bottom structure, is disposed in a manner recessed in the bottom structure in the direction of the roof assembly, and/or that the receiving channel is disposed in a manner recessed in the bottom structure on the side turned away from the roof assembly. Due to the formation of the receiving channel on the bottom structure, yet an additional stiffening of the same can be achieved in cooperation with the central longitudinal beam.

Furthermore, it may be advantageous when one of the transverse walls forms the front end of the vehicle body and is provided with a retaining frame as well as at least one windshield held in the retaining frame. Due to the integration of the transverse walls as load-bearing constituents of the vehicle body, the front end of the vehicle may also be formed jointly as a load-bearing constituent. Thus, for adequate, stable fastening of the windshield on the retaining frame, the frontmost transverse wall may also exert a load-bearing function for formation of the vehicle body.

Another alternative embodiment is characterized in that at least individuals of the transverse walls are disposed in a transverse plane aligned in perpendicular direction with respect to the vehicle longitudinal direction. Thereby twistings of the vehicle body, which start from the underbody assembly and are transmitted to the entire vehicle body during traveling operation, can be minimized.

A further preferred embodiment is characterized in that the roof assembly is provided with at least one roof beam as well as with at least one roof element joined to the at least one roof beam. Thus a stable and load-bearing structure of the roof assembly can be created.

Furthermore, it may be advantageous when the roof assembly comprises a left roof beam, a right roof beam and at least one further roof beam, which at least one further roof beam is disposed between the left roof beam and the right roof beam in perpendicular direction with respect to the vehicle longitudinal direction and which at least one further roof beam is likewise joined to the roof element. Due to the provision of several roof beams, it is also possible, in the roof region of the vehicle, not only to create a stiffening of the same but also to create at least one receiving space for equipment items to be taken along or carried along.

Another embodiment is characterized in that two further roof beams are provided, and the two further roof beams are disposed spaced apart from one another in perpendicular direction with respect to the vehicle longitudinal direction. Thus the natural stiffness of the entire roof assembly may be further additionally improved.

A further possible embodiment has the features that at least individuals of the roof beams are securely joined to at least one of the transverse walls. Thus the entire load-bearing capacity of the vehicle structure may be improved and increased.

A further design provides that the vehicle body further comprises an outer paneling disposed at least in portions. By the provision of an additional outer paneling, an outer closure of the vehicle body may therefore be created depending on need.

Finally, a further preferred embodiment is characterized in that the vehicle body, together with the longitudinal beam, forms a self-supporting structure. Thus a structural concept can be created that offers the capability of being able to react rapidly to and better accommodate individual customer wishes.

For better understanding of the invention, it will be explained in more detail on the basis of the following figures.

Therein, respectively in greatly simplified schematic diagrams.

By way of introduction, it is pointed out that like parts in the differently described embodiments are denoted with like reference symbols or like structural-part designations, wherein the disclosures contained in the entire description can be carried over logically to like parts with like reference symbols or like structural-part designations. The position indications chosen in the description, such as top, bottom, side, etc., for example, are also relative to the figure being directly described as well as illustrated, and these position indications are to be logically carried over to the new position upon a position change.

The term "in particular" or "especially" will be understood hereinafter to mean a possible more special design or more detailed specification of an item or of a method step, but does not necessarily have to represent a mandatory, preferred embodiment of the same or a mandatory procedure.

Figure 1:
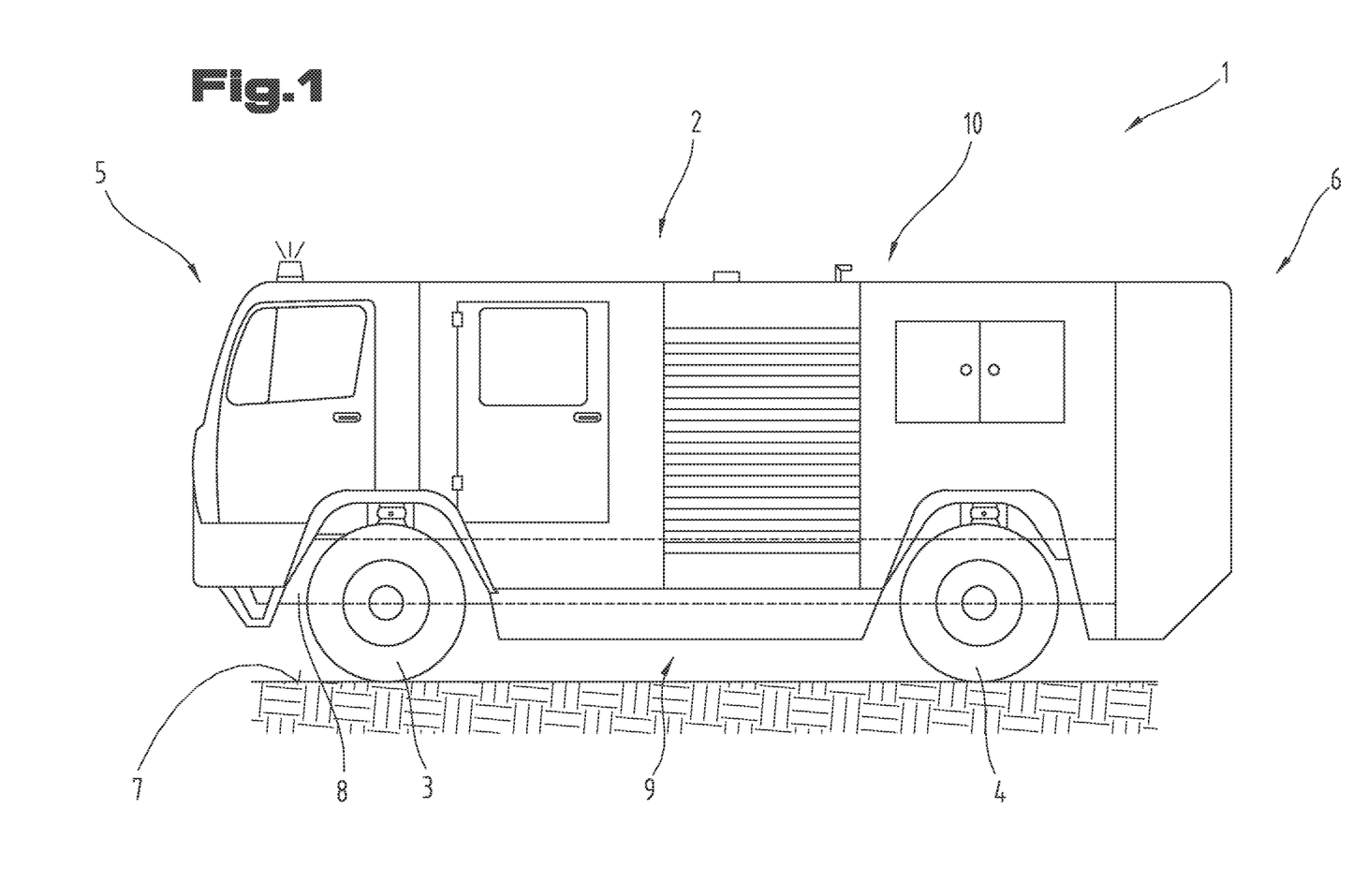
FIG. 1 shows a heavy truck designed as an emergency vehicle, in side view.

In FIG. 1, an emergency vehicle 1 is shown in a simplified side view. The emergency vehicle 1 may be used for the most diverse operational purposes, especially as a fire truck, public works vehicle or even as a transportation vehicle. Furthermore, the emergency vehicle 1 in the present exemplary embodiment is designed as a so-called heavy truck and comprises a vehicle body 2, at least one front-wheel pair 3 and at least one rear-wheel pair 4. It would even be possible to use dual wheels instead of individual wheels.

In the exemplary embodiment shown here, one possible form of an emergency vehicle is illustrated as a fire truck. The most diverse storage compartments and/or storage boxes may be provided in the vehicle body 2, so that the equipment items, tools and much more necessary for operations can be carried along in orderly manner. For this purpose, the storage compartments and/or storage boxes may be closed for transportation and made accessible as needed by means of doors, rolling shutters or other closure elements.

For the sake of better clarity, the illustration of a drive unit or other units or structural-part components has not been presented.

The emergency vehicle 1 has a front end 5 and a tail end 6 spaced apart therefrom in vehicle longitudinal direction, whereby an overall length or vehicle length is defined. Furthermore, it is also shown here that the emergency vehicle 1 is parked on a preferably horizontally aligned contact surface 7 or is braced thereon.

The basic structure of the emergency vehicle 1 is formed by the vehicle body 2 as well as a central longitudinal beam 8. Here it will be understood as any structure designed among other purposes to carry the individual wheel pairs, the drive elements and many other components. This overall structure may also be referred to as the vehicle structure.

The central longitudinal beam 8 together with the vehicle body 2 forms a self-supporting structure. In turn, the vehicle body 2 comprises an underbody assembly 9, a roof assembly 10 and a left longitudinal wall 11 and/or a right longitudinal wall 12. In this connection, the viewing direction is chosen in the direction of the normal, customary travel direction. In this exemplary embodiment, both a left longitudinal wall 11 and a right longitudinal wall 12 are shown and described, wherein it is possible to provide only one of the two longitudinal walls 11, 12. Each of the two longitudinal walls 11, 12 is disposed between the underbody assembly 9 and the roof assembly 10. Viewed in travel direction, the central longitudinal beam 8 is preferably disposed in the middle with respect to the emergency vehicle 1, especially of its wheel pairs 3, 4, as well as in a manner extending in vehicle longitudinal direction. The at least two wheel pairs 3, 4 are preferably held on the central longitudinal beam 8, but for reasons of clarity their fastening and drive are not illustrated in more detail. A drive unit, not illustrated and described in detail, is in driving communication with at least one of the wheel pairs 3, 4.

The central longitudinal beam 8 may also be referred to as the core tube and is designed as a hollow-profile member, which preferably has a polygonal cross section. As examples of the material for the longitudinal beam 8, it is possible to select, depending on load, aluminum, the most diverse Al alloys and/or even steel, however, with the most diverse additions and alloys formed therefrom. However, it would also even be possible to use compound materials, laminates, composite materials or the like. Thus the longitudinal beam 8 may be assembled from profiles and/or folded metal sheets in order to obtain a cohesive single structural part. All materials described in the foregoing or else even possible material combinations thereof may be used not only for the formation of the longitudinal beam 8 but also even for formation of the vehicle body 2, especially the structural-part components yet to be described in the following. These may be, for example, the underbody assembly 9, the roof assembly 10, the side walls or the longitudinal walls 11, 12, a bottom structure 13, an outer paneling 17 as well as transverse walls 14. For the choice of compound materials, these may be assembled to a common structural unit, depending on the manufacturing method, from at least one longitudinal wall 11, 12, the transverse walls 14, the roof assembly 10 as well as, if applicable, the underbody assembly 9.

Furthermore, the central longitudinal beam 8 is securely joined directly to the vehicle body 2, in particular is joined in screwed, riveted and/or partly substance-to-substance-bonded manner. The central longitudinal beam 8 further forms an integral constituent of the underbody group 9 of the vehicle body 2. This means that the vehicle body 2 is not built as usual on a load-bearing intermediate frame and that the load-bearing intermediate frame is braced on the central longitudinal beam 8, but instead that the intermediate frame is entirely omitted. Thus the central longitudinal beam 8, together with the underbody assembly 9, forms a lower chord, especially a tension chord, of the vehicle body 2.

In the following FIGS. 2 to 9, possible different arrangements of individual structural-part components of the self-supporting structure for formation of the emergency vehicle 1 are shown, as are different designs thereof. The basic design of the self-supporting structure is illustrated merely in greatly stylized manner in FIGS. 3 to 9.

Figure 2:
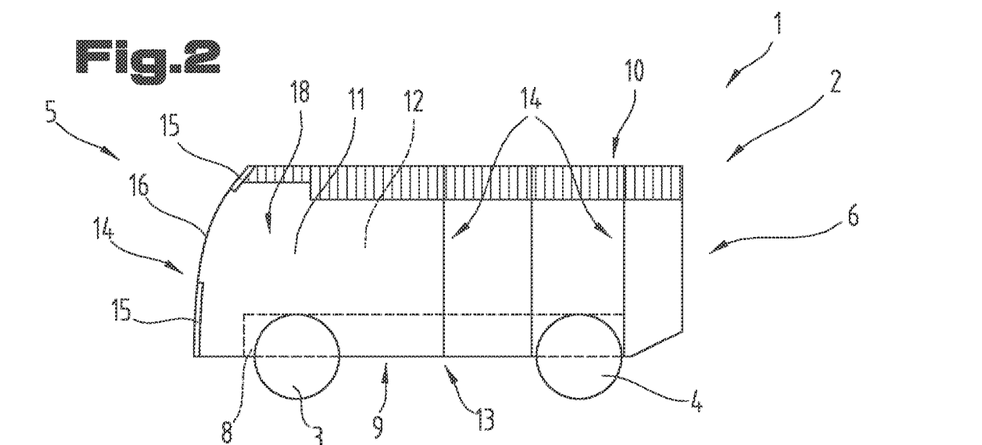
FIG. 2 shows a simplified structural design of an emergency vehicle, in side view.

Thus the self-supporting structure for formation of the emergency vehicle 1 having the vehicle body 2 and the longitudinal beam 8 is shown in FIG. 2. The underbody assembly 9 of the vehicle body 2 may also comprise, in addition to the longitudinal beam 8, even a bottom structure 13, which extends, starting from the longitudinal beam 8, respectively to the two longitudinal walls 11, 12. In the lower corner region or longitudinal-rim region, the bottom structure 13 may be securely joined respectively to the longitudinal walls 11, 12. For formation of the stable self-supporting structure, the bottom structure 13 is securely joined directly to the central longitudinal beam 8.

The vehicle body 2 comprises at least one transverse wall 14, but usually several transverse walls 14, which are designed as load-bearing transverse crossbars. Each of the transverse walls 14 is aligned in transverse direction, especially in perpendicular direction with respect to the longitudinal extent or the vehicle longitudinal direction of the vehicle body 2. Depending on construction and arrangement, the transverse walls 14 are likewise joined to at least one of the longitudinal walls 11, 12 to obtain a load-bearing structural unit. If two longitudinal walls 11, 12 are provided, preferably a secure joint of the transverse walls 14 is formed with both longitudinal walls 11, 12.

Furthermore, it is also shown here that even that transverse wall 14 which forms the front end 5 of the vehicle body 2 is provided with a retaining frame 15 as well as at least one windshield 16 held in the retaining frame 15.

In order to achieve an adequate natural stiffness even in the region of the underbody assembly 9, at least individuals of the transverse walls 14 are securely joined directly to the central longitudinal beam 8 of the underbody assembly 9. Furthermore, yet another joint, which is secure at least in regions, of the transverse walls 14 with the bottom structure 13 may also be made.

The roof assembly 10 forms an upper chord, especially a compression chord, of the vehicle body 2.

In addition, the vehicle body 2 further comprises an outer paneling 17 disposed at least in portions. The outer paneling 17 may be provided or disposed in addition to at least one of the two longitudinal walls 11, 12 or itself may form at least one of the two longitudinal walls 11, 12, at least in portions, and thus contribute to the increase of the natural stiffness. Preferably, however, the two longitudinal walls 11, 12 are used as load-bearing structural parts or are designed as such. The outer paneling 17 may also be disposed in a manner covering the entire vehicle body 2 externally. Rolling shutters, doors, sliding doors or other closure parts may also be counted as the outer paneling 17.

In the currently common heavy trucks, a separate driver's cab is provided, which is mounted and held in tiltable or foldable manner on the vehicle frame or vehicle chassis. For the vehicle body 2 shown in this exemplary embodiment, it is further provided that it also includes even a driver's cab 18 as an integral constituent. Thus the driver's cab 18 is likewise a secure and fixed constituent of the self-supporting structure of the emergency vehicle 1. Thus the vehicle body 2 together with the longitudinal beam 8 integrated therein forms a structural, continuously cohesive unit from the front end 5 to the tail end 6.

The central longitudinal beam 8 extends continuously in the vehicle longitudinal direction, starting from the region underneath the driver's cab 18 and at least projecting beyond the rear-wheel pair 4.

The overall height as well as the vehicle width of the emergency vehicle 1 may be selected according to the respective legal regulations.

The arrangement of the individual transverse walls 14 may be freely selected according to need and the necessary space requirement as well as the individual purpose of use. Thus not only may the front end 5 of the driver's cab 18 be formed by a built-in transverse wall 14, but so also may be even that transverse wall 14 which is used for formation of the tail end 6.

In the exemplary embodiment shown in FIG. 2, the tail-end region of the vehicle body 2 is designed for receiving of a loading arrangement, not illustrated in detail, having a loading platform, which is preferably adjustable in height in vertical direction. Thus the load-bearing transverse wall 14 is disposed spaced apart from the tail end 6 in the direction of the front end or the front side 5. One front-wheel pair 3 and only one rear-wheel pair 4 are held on the longitudinal beam 8. The longitudinal extent of the longitudinal beam 8 ends directly behind the rear-wheel pair 4, in order in this way to create a tail-end clear space within the vehicle body 2.

Figure 3:
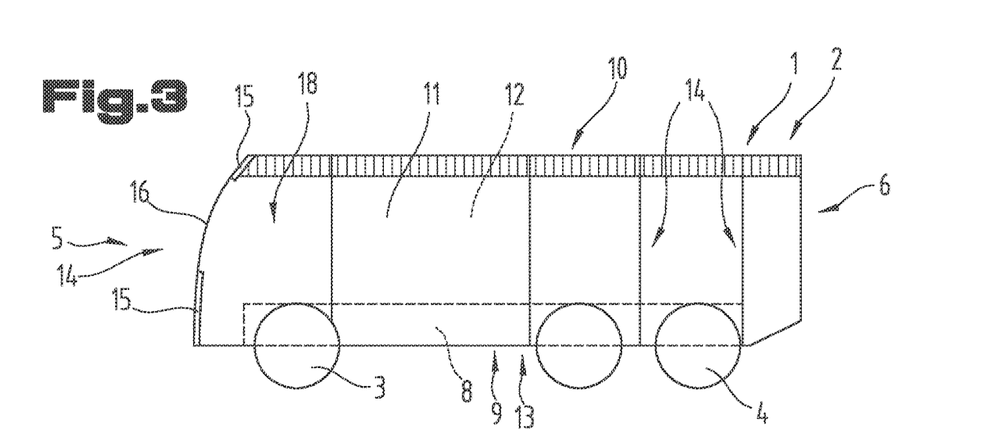
FIG. 3 shows another simplified structural design of an emergency vehicle, in side view.

In FIG. 3, a further possible design is shown of the emergency vehicle 1 with its vehicle body 2 and the integral longitudinal beam 8. The basic self-supporting structural design is also realized once again. Therefore, to avoid unnecessary repetitions, the detailed description in the foregoing FIGS. 1 and 2 is invoked or reference is made thereto. Once again, like reference symbols or structural-part designations, as in the foregoing FIGS. 1 and 2, are used for like parts. If necessary, this construction may form an independent embodiment.

Here also, the self-supporting structure for formation of the emergency vehicle 1 comprises the vehicle body 2 and the longitudinal beam 8. Furthermore, the vehicle body 2 also comprises, as described in the foregoing, the underbody assembly 9, the roof assembly 10, the two longitudinal walls 11, 12 and preferably several transverse walls 14. All of these structural parts or structural-part groups are joined securely and/or rigidly to one another as a self-supporting structure.

Furthermore, it can also be seen here that the emergency vehicle 1, compared with the emergency vehicle 1 shown in FIG. 2, has a larger or longer vehicle length than therein. For this purpose, two rear-wheel pairs 4 may be provided.

The tail end of the vehicle body 2 is equipped on the ground side with a taper descending from the roof assembly 10 toward the underbody assembly 9. This may be referred to as an inwardly sloping tail. The longitudinal beam 8 extends directly to the tapered tail or the tail end 6. The driver's cab 18 is likewise an integral, one-piece constituent of the vehicle body 2.

Figure 4:
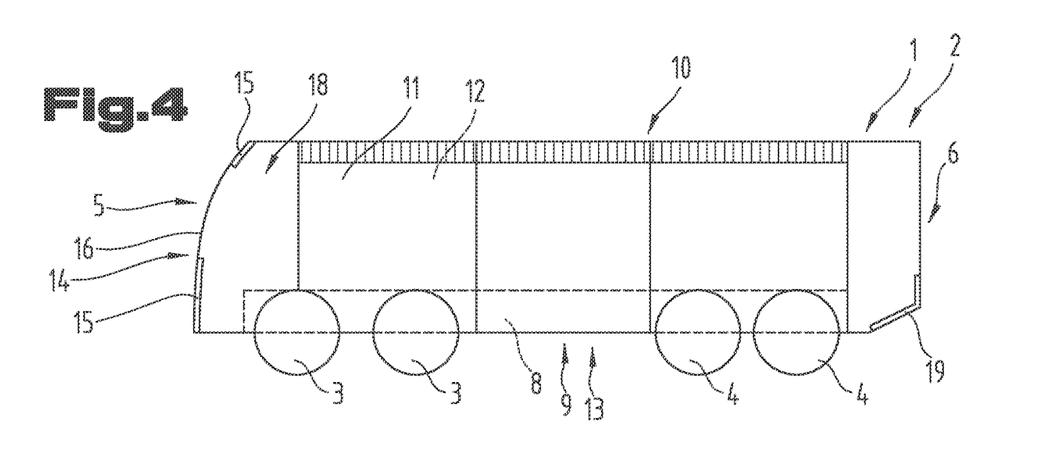
FIG. 4 shows a further possible structural design of an emergency vehicle, in side view and simplified diagram.

The emergency vehicle 1 illustrated in FIG. 4 has the same basic design having the self-supporting structure as the emergency vehicle 1 described in FIGS. 1 to 3.

The difference in these constructions consists merely in the longer vehicle length. Furthermore, two front-wheel pairs 3 and two rear-wheel pairs 4 are fastened on the longitudinal beam 8.

In the region of the underbody assembly 9 close to the ground, an end transverse beam 19 is provided that forms the load-bearing tail-end closure of the vehicle body 2. The end transverse beam 19 may be joined securely to the self-supporting structural unit or structure via both the longitudinal beam 8 and/or the bottom structure 13 as well as via the two longitudinal walls 11, 12.

Figure 5:
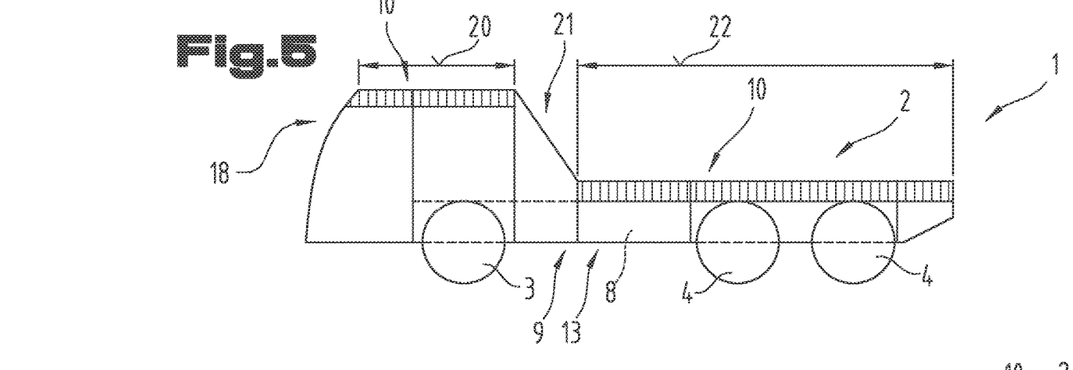
FIG. 5 shows another simplified structural design of an emergency vehicle, in side view.

FIG. 5 shows a further possible and as the case may be independent embodiment of the emergency vehicle 1, wherein once again like reference symbols or structural-part designations are used for like parts, as in the foregoing FIGS. 1 to 4. To avoid unnecessary repetitions, the detailed description in the foregoing FIG. 1 to FIG. 4 is invoked or reference is made thereto.

This emergency vehicle 1 may be used, for example, for formation of a turntable ladder, a cherry picker or any other elevating aid. For this purpose, it is provided here that the vehicle body 2 comprises, in the region of the front end 5, at least the driver's cab 18 as well as even a crew compartment if necessary and/or a receiving space for equipment items. In this portion, the vehicle body 2 has an overall height adapted appropriately to the provided additional structure.

In contrast to the emergency vehicles 1 shown in FIGS. 1 to 4, the driver's cab 18 is disposed here in a manner set even lower than in the exemplary embodiments described in the foregoing. In order to permit this, the longitudinal beam 8 ends at the cab back wall of the driver's cab 18 turned toward the tail end 6 and preferably formed by a transverse wall 14.

Here also the underbody assembly 9 and the roof assembly 10 are provided. As seen in side view, however, the roof assembly 10 has a longitudinal shape that is formed in stepped manner from the front end 5 to the tail end 6. A stepped construction means that the roof assembly 10, in its longitudinal extent, is disposed in a manner running in at least two planes different from one another. Thus a spacing different from one another may be realized between the underbody assembly 9, disposed mostly running in one plane, and individual longitudinal portions of the roof assembly 10. It would also even be possible to provide more than two planes for the roof assembly 10.

A first longitudinal portion of the roof assembly 10 in the region of the driver's cab 18 as well as a body region possibly attached thereto is disposed in a manner running approximately parallel with respect to the underbody assembly 9, especially the longitudinal beam 8. This longitudinal region or longitudinal portion of the roof assembly 10 extends approximately from one third to one half of the entire vehicle length and forms a first roof region 20. Following this, an intermediate region 21 on the first roof region 20 is disposed or provided that is formed in a manner descending in the direction of the underbody assembly 9. For the rest of the vehicle length, the transverse walls 14 are formed with a smaller overall height than in the region of the driver's cab 18 or of the first roof region 20 of the roof assembly 10. In this way, it is achieved that the roof assembly 10 is disposed directly above the underbody assembly 9 in the region or the longitudinal portion of a second roof region 22. The self-supporting structure or the self-supporting structural unit is also retained in this longitudinal portion of the second roof region 22.

Figure 6:
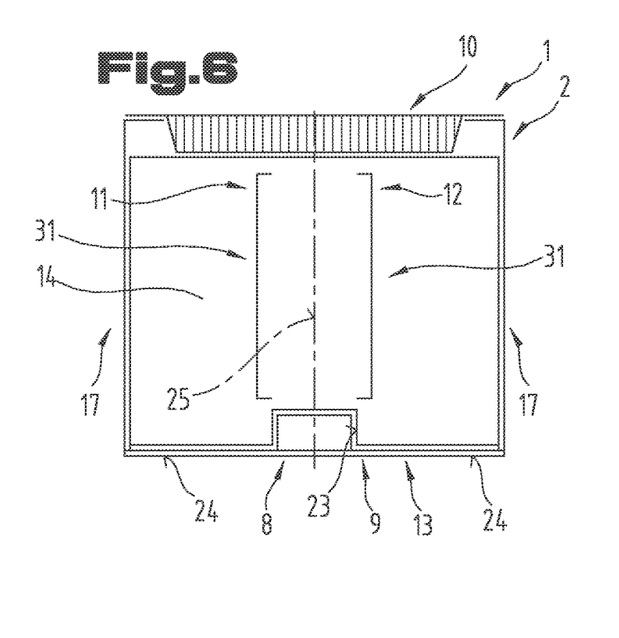
FIG. 6 shows a cross section through a possible structural design of an emergency vehicle, in simplified diagram.

In FIG. 6, a possible cross section is shown through the self-supporting structure of the emergency vehicle 1, wherein, once again, like reference symbols or structural-part designations are used for like parts, as in the foregoing FIGS. 1 to 5. To avoid unnecessary repetitions, the detailed description in the foregoing FIG. 1 to FIG. 5 is invoked or reference is made thereto.

Furthermore, the illustration of the wheel pairs 3, 4 is omitted and only the basic self-supporting unit or the self-supporting structure is illustrated better and more clearly.

The underbody assembly 9 shown here comprises the bottom structure 13 as well as the central longitudinal beam 8 joined directly thereto. A receiving channel 23 is disposed or formed in the bottom structure 13, wherein the receiving channel 23 extends in vehicle longitudinal direction. Furthermore, it is also provided here that the central longitudinal beam 8 is received at least in regions in the receiving channel 23. It can also be further seen that the receiving channel 23, starting from a bottom underside 24 of the bottom structure 13, is disposed in a manner recessed in the bottom structure 13 in the direction of the roof assembly 10.

In the present exemplary embodiment, the transverse wall 14 shown here extends up to the outer paneling 17 disposed externally on the vehicle body 2.

Viewed in cross section, the left longitudinal wall 11 as well as the right longitudinal wall 12 described in the foregoing have a C-shaped or U-shaped cross section here. The two longitudinal walls 11, 12 are disposed in a manner offset from the outer lateral boundary of the vehicle body 2, in the present exemplary embodiment from the outer panelings 17 in the direction of a middle longitudinal plane 25 running at the center of the longitudinal beam 8, and toward this. Furthermore, the two longitudinal walls 11, 12 are disposed in the region close to the roof assembly 10 and underneath it. Once again, a secure joint of the two longitudinal walls 11, 12 with the transverse wall or walls 14 is also provided here.

The roof assembly 10 may be formed, for example, by a so-called sandwich beam or a sandwich plate, which forms the entire roof region of the vehicle body 2. The secure joint between the transverse walls 14, the underbody assembly 9, the roof assembly 10 and the two longitudinal walls 11, 12 may be made by analogy with what has already been described in the foregoing. What is essential in order to be able to form the self-supporting structure is the secure and/or rigid joint between the respective structural parts at the respective contact points or abutting points. Depending on material selection, the mutual joint between the structural parts, to be joined to one another, of the vehicle body 2 and/or of the longitudinal beam 8 may also be made by means of a lamination process.

Figure 7:
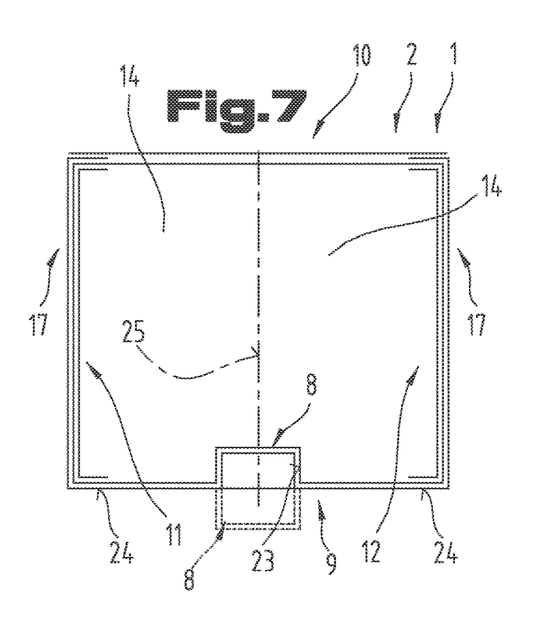
FIG. 7 shows a cross section of another possible structural design of an emergency vehicle, in simplified diagram.

In the exemplary embodiment, illustrated in FIG. 7, of the cross section of the vehicle body 2 as well as of the longitudinal beam 8, the underbody assembly 9, the roof assembly 10 and the two longitudinal walls 11, 12 are likewise evident. Once again, the receiving channel 23 described in the foregoing is provided for receiving of the central longitudinal beam 8 in the bottom structure 13.

The two longitudinal walls 11, 12 are disposed in the region of the outer enclosure of the vehicle body 2, and they preferably extend continuously between the underbody assembly 9 and the roof assembly 10. A corresponding secure joint with these two structural groups 9, 10 may likewise be provided. Similarly, a secures stable joint of the two longitudinal walls 11, 12 with the transverse wall or walls 14 may also be provided once again.

By virtue of the stable construction of the two longitudinal walls 11, 12, the roof assembly 10 may be formed with a smaller load-bearing function in this exemplary embodiment shown here than was shown in the foregoing in FIG. 6.

In all of the exemplary embodiments described up to now, the longitudinal beam 8, in the direction of the roof assembly 10, is received in recessed manner in the bottom structure 13 of the underbody assembly 9. It is also indicated in dashed lines that the longitudinal beam 8 may also be disposed or received in a receiving channel 23 provided in the bottom structure 13, which receiving channel 23 is formed in a manner recessed in the bottom structure 13 on the side turned away from the roof assembly 10. Thus the receiving channel 23 projects beyond the bottom underside 24 of the bottom structure 13 in the direction of the contact surface 7.

In the two cross sections of the vehicle body 2 illustrated in FIGS. 6 and 7, the roof assembly 10 respectively has an approximately or predominantly flat construction.

Figure 8:
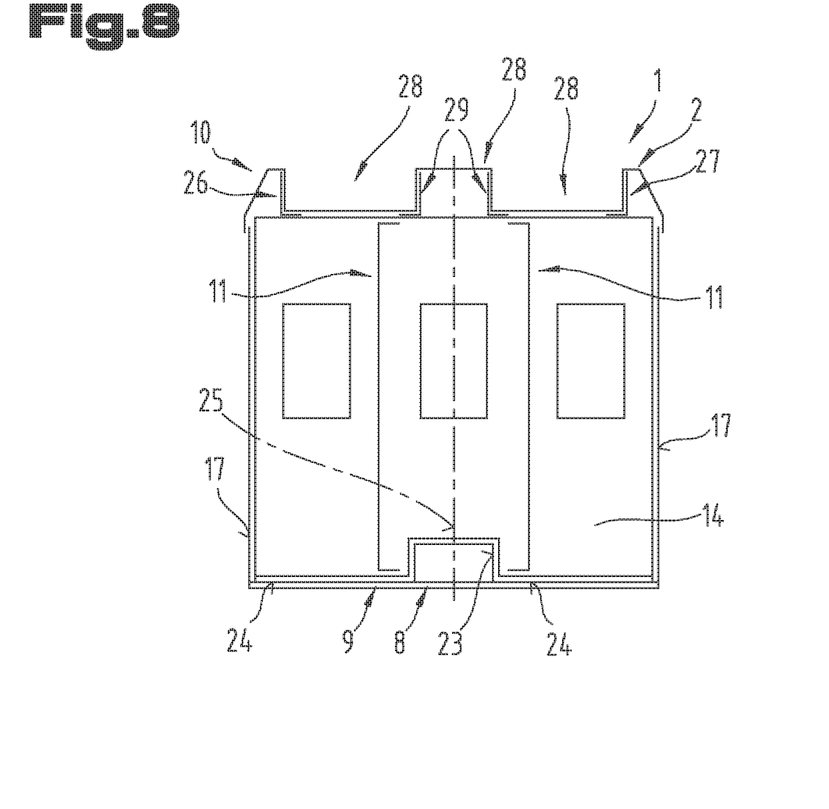
FIG. 8 shows a cross section of a further possible structural design of an emergency vehicle, in simplified diagram.

In FIG. 8, a further and as the case may be independent embodiment of the vehicle body 2 as well as of the longitudinal beam 8 is shown, wherein once again like reference symbols or structural-part designations are used for like parts, as in the foregoing FIGS. 1 to 7. To avoid unnecessary repetitions, the detailed description in the foregoing FIG. 1 to FIG. 7 is invoked or reference is made thereto.

Here also, the vehicle body 2 comprises the underbody assembly 9, the roof assembly 10, the two longitudinal walls 11, 12 and the transverse walls 14. The transverse wall 14 illustrated here may have recesses or openings, in order in this way to increase the receiving space located within the vehicle body 2 or else also to save weight.

In contrast to the roof assembly 10 formed in flat manner on the outside in the foregoing, it is further shown here that the roof assembly 10 may be provided with a stepped or detached structure in transverse direction relative to the vehicle longitudinal direction, for example for receiving of equipment items and apparatus to be carried along in the region of the roof, such as ladders, bars, pipes or transportation crates, for example.

Thus the roof assembly 10 may be provided with a left roof beam 26 and a right roof beam 27, for example. In addition, the roof assembly 10 may also even comprise at least one roof element 28 joining the left and the right roof beams 26, 27. Should several receiving regions disposed in a manner recessed in the roof assembly 10 be created, it is possible for the roof assembly 10 to comprise at least one further roof beam 29. Preferably, however, two further roof beams 29 are provided, wherein the two further roof beams 29 may be disposed spaced apart from one another in perpendicular direction with respect to the vehicle longitudinal direction. Furthermore, the at least one further roof beam 29 is disposed in perpendicular direction with respect to the vehicle longitudinal direction between the left roof beam 26 and the right roof beam 27. It would even be possible for the at least one further roof beam 29 to be joined likewise to the roof element 28, especially joined in secure or fixed manner.

For formation of a stable, secure construction of the overall load-bearing structure, it is also advantageous when the roof assembly 10, especially its roof beams 26, 27, 29, is joined securely to at least one of the transverse walls 14. In this way the roof assembly 10 may be integrated as a compression chord in the formation of the self-supporting vehicle body 2.

Figure 9:
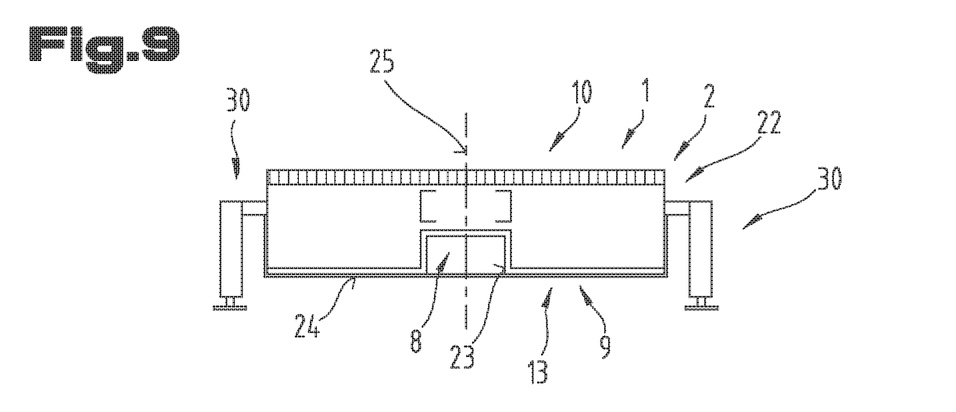
FIG. 9 shows the possible structural design of an emergency vehicle according to FIG. 5, in cross section and simplified diagram.

FIG. 9 shows a possible cross section of the vehicle body 2 as well as of the longitudinal beam 8 for that emergency vehicle 1, as was shown and described in the foregoing in FIG. 5. The central longitudinal beam 8 is received in the receiving channel 23 of the bottom structure 13 for formation of the cohesive underbody assembly 9. Furthermore, transverse walls 14 are provided or disposed between the underbody assembly 9 and the roof assembly 10. By virtue of the small vertical overall height of the transverse walls 14 in the second detached roof region 22, the two longitudinal walls 11, 12 also have only a low overall height. For reinforcement of the longitudinal beam 8, the two longitudinal walls 11, 12 are disposed directly above the longitudinal beam 8, without substantial lateral offset with respect thereto. The roof assembly 10 may in turn be realized, for example, by a sandwich structure, in order to be able in this way to form an adequately strong compression chord of the vehicle body.

Furthermore, it is also illustrated at the sides of the vehicle body 2 here that an additional bracing means 30, as is sufficiently known, may be used to lighten the load on the wheel pairs 3, 4. Thus the contact surface of the emergency vehicle 1 can be enlarged and beyond this the stability can also be improved.

In general, it must still be pointed out that a high degree of freedom for subdivision of the receiving space enclosed by the vehicle body 2 into the most diverse compartments 31 is created due to the possibility created here of variable arrangement of the transverse walls 14 and at least one of the longitudinal walls 11, 12 in conjunction with the roof assembly 10. Several of the compartments 31 are indicated in FIG. 6. In this way, a predefined location for the receiving of equipment items, assemblies, crates, containers or else merely a storage room can be provided in the compartments 31 separated from one another. Depending on arrangement, at least one compartment 31 may also form a tank for an extinguishing agent and/or an additional extinguishing agent. It would also even be possible for the emergency vehicle 1 to comprise at least one independent tank, especially an extinguishing-agent tank, within the receiving space enclosed by the vehicle body 2, wherein the independent tank is then joined securely to the central longitudinal beam 8 and/or the underbody assembly 9.

The exemplary embodiments show possible embodiment variants, wherein it must be noted at this place that the invention is not restricted to the specially illustrated embodiment variants of the same, but to the contrary diverse combinations of the individual embodiment variants with one another are also possible and, on the basis of the teaching of the technical handling by the subject invention, this variation possibility lies within the know-how of the person skilled in the art and active in this technical field.

The scope of protection is defined by the claims. However, the description and the drawings are to be used for interpretation of the claims. Individual features or combinations of features from the shown and described different exemplary embodiments may represent inventive solutions that are independent in themselves. The task underlying the independent inventive solutions may be inferred from the description.

All statements about value ranges in the description of the subject matter are to be understood to the effect that they jointly comprise any desired and all sub-ranges therefrom, e.g. the statement 1 to 10 is to be understood to the effect that all sub-ranges, starting from the lower limit 1 and the upper limit 10 are jointly comprised, i.e. all sub-ranges begin with a lower range of 1 or greater and end at an upper limit of 10 or smaller, e.g. 1 to 1.7, or 3.2 to 8.1, or 5.5 to 10.

Finally, it must be pointed out, as a matter of form, that some structural parts or elements have been illustrated not to scale and/or enlarged and/or reduced for better understanding of the structure of the emergency vehicle 1, especially its self-supporting structure.

LIST OF REFERENCE NUMERALS

1 Emergency vehicle
2 Vehicle body
3 Front-wheel pair
4 Rear-wheel pair
5 Front end
6 Tail end
7 Contact surface
8 Longitudinal beam
9 Underbody assembly
10 Roof assembly
11 Left longitudinal wall
12 Right longitudinal wall
13 Bottom structure
14 Transverse wall
15 Retaining frame
16 Windshield
17 Outer paneling
18 Driver's cab
19 End transverse beam
20 First roof region
21 Intermediate region
22 Second roof region
23 Receiving channel 24 Bottom underside
25 Middle longitudinal plane
26 Left roof beam
27 Right roof beam
28 Roof element
29 Roof beam
30 Bracing means
31 Compartment

The invention claimed is:

1. An emergency vehicle designed as a truck having a front end and a tail end spaced apart therefrom in vehicle longitudinal direction and comprising:
    a vehicle body having an underbody assembly, a roof assembly and a left longitudinal wall and a right longitudinal wall, wherein the longitudinal walls are disposed between the underbody assembly and the roof assembly;
    a central longitudinal beam, which longitudinal beam is disposed in a manner extending in vehicle longitudinal direction, wherein
    the underbody assembly comprises a bottom structure and the bottom structure is securely joined directly to the central longitudinal beam, and wherein
    the central longitudinal beam forms an integral constituent of the underbody assembly of the vehicle body,
    at least one front-wheel pair and at least one rear-wheel pair, wherein the at least two wheel pairs are held on the central longitudinal beam;
    wherein the underbody assembly forms a bottom chord of the vehicle body,
    wherein the roof assembly forms an upper chord of the vehicle body,
    wherein the vehicle body comprises several transverse walls,
    wherein at least individuals of the transverse walls are securely joined directly to the central longitudinal beam of the underbody assembly, and are also securely joined to the left longitudinal wall of the vehicle body and also to the right longitudinal wall of the vehicle body,
    wherein the vehicle body comprises a driver's cab, which driver's cab forms an integral structural unit of the vehicle body,
    wherein the central longitudinal beam is securely joined directly to the vehicle body, and
    wherein the vehicle body together with the longitudinal beam integrated therein forms a structural, continuously cohesive unit from the front end to the tail end.

2. The emergency vehicle according to claim 1, wherein the longitudinal beam is designed as a hollow-profile member having a polygonal cross section.

3. The emergency vehicle according to claim 1, wherein a receiving channel is disposed or formed in the bottom structure, which receiving channel extends in vehicle longitudinal direction, and in that wherein the central longitudinal beam (8) is received at least in some regions in the receiving channel (23).

4. The emergency vehicle according to claim 3, wherein the receiving channel starting from a bottom underside of the bottom structure, is disposed in a manner recessed in the bottom structure in the direction of the roof assembly (10), and/or wherein the receiving channel is disposed in a manner recessed in the bottom structure on the side turned away from the roof assembly.

5. The emergency vehicle according to claim 1, wherein one of the transverse walls forms the front end of the vehicle body and is provided with a retaining frame as well as at least one windshield held in the retaining frame.

6. The emergency vehicle according to claim 1, wherein at least individuals of the transverse walls are disposed in a transverse plane aligned in perpendicular direction with respect to the vehicle longitudinal direction.

7. The emergency vehicle according to claim 1, wherein the roof assembly is provided with at least one roof beam as well as with at least one roof element joined to the at least one roof beam.

8. The emergency vehicle according to claim 7, wherein the roof assembly comprises a left roof beam, a right roof beam and at least one further roof beam, which at least one further roof beam is disposed between the left roof beam and the right roof beam in perpendicular direction with respect to the vehicle longitudinal direction and the at least one further roof beam is likewise joined to the roof element.

9. The emergency vehicle according to claim 8, wherein two further roof beams are provided, and the two further roof beams are disposed spaced apart from one another in perpendicular direction with respect to the vehicle longitudinal direction.

10. The emergency vehicle according to claim 7, wherein at least individuals of the roof beams are securely joined to at least one of the transverse walls.

11. The emergency vehicle according to claim 1, wherein the vehicle body further comprises an outer paneling disposed at least in portions.

12. The emergency vehicle according to claim 1, wherein the vehicle body, together with the longitudinal beam, forms a self-supporting structure.

13. An emergency vehicle designed as a truck having a front end and a tail end spaced apart therefrom in vehicle longitudinal direction and comprising:
    a vehicle body having an underbody assembly, a roof assembly and a left longitudinal wall and a right longitudinal wall, wherein the longitudinal walls are disposed between the underbody assembly and the roof assembly;
    a central longitudinal beam, which longitudinal beam is disposed in a manner extending in vehicle longitudinal direction, wherein
    the underbody assembly comprises a bottom structure and the bottom structure is securely joined directly to the central longitudinal beam, and wherein
    the central longitudinal beam forms an integral constituent of the underbody assembly of the vehicle body,
    at least one front-wheel pair and at least one rear-wheel pair, wherein the at least two wheel pairs are held on the central longitudinal beam;
    wherein the underbody assembly forms a bottom chord of the vehicle body,
    wherein the roof assembly forms an upper chord of the vehicle body,
    wherein the vehicle body comprises several transverse walls,
    wherein at least individuals of the transverse walls are securely joined directly to the central longitudinal beam of the underbody assembly,
    wherein at least individuals of the transverse walls are securely joined to at least one of the longitudinal walls of the vehicle body,
    wherein the vehicle body comprises a driver's cab, which driver's cab forms an integral structural, one-piece unit of the vehicle body,
    wherein the central longitudinal beam is securely joined directly to the vehicle body, and wherein the vehicle body together with the longitudinal beam integrated therein forms a structural, continuously cohesive unit from the front end to the tail end.

14. An emergency vehicle designed as a truck having a front end and a tail end spaced apart therefrom in vehicle longitudinal direction and comprising:
- a vehicle body having an underbody assembly, a roof assembly and a left longitudinal wall and a right longitudinal wall, wherein the longitudinal walls are disposed between the underbody assembly and the roof assembly;
- a central longitudinal beam, which longitudinal beam is disposed in a manner extending in vehicle longitudinal direction, wherein
- the underbody assembly comprises a bottom structure and the bottom structure is securely joined directly to the central longitudinal beam, and wherein
- the central longitudinal beam forms an integral constituent of the underbody assembly of the vehicle body,
- at least one front-wheel pair and at least one rear-wheel pair, wherein the at least two wheel pairs are held on the central longitudinal beam;

wherein the underbody assembly forms a bottom chord of the vehicle body,
wherein the roof assembly forms an upper chord of the vehicle body,
wherein the vehicle body comprises several transverse walls,
wherein at least individuals of the transverse walls are securely joined directly to the central longitudinal beam of the underbody assembly,
wherein at least individuals of the transverse walls are securely joined to at least one of the longitudinal walls of the vehicle body,
wherein the vehicle body comprises a driver's cab, which driver's cab forms an integral structural unit of the vehicle body,
wherein the left longitudinal wall and the right longitudinal wall extend throughout the driver's cab,
wherein the central longitudinal beam is securely joined directly to the vehicle body, and
wherein the vehicle body together with the longitudinal beam integrated therein forms a structural, continuously cohesive unit from the front end to the tail end.

* * * * *